United States Patent
Dong et al.

(10) Patent No.: US 12,067,987 B2
(45) Date of Patent: Aug. 20, 2024

(54) METHOD AND DEVICE OF GENERATING ACOUSTIC FEATURES, SPEECH MODEL TRAINING, AND SPEECH RECOGNITION

(71) Applicant: Beijing Youzhuju Network Technology Co., Ltd., Beijing (CN)

(72) Inventors: Linhao Dong, Beijing (CN); Zejun Ma, Beijing (CN)

(73) Assignee: BEIJING YOUZHUJU NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/427,538

(22) Filed: Jan. 30, 2024

(65) Prior Publication Data
US 2024/0169988 A1    May 23, 2024

Related U.S. Application Data

(63) Continuation of application No. PCT/CN2022/109381, filed on Aug. 1, 2022.

(30) Foreign Application Priority Data

Aug. 2, 2021 (CN) .......................... 202110881723.7

(51) Int. Cl.
*G10L 15/02* (2006.01)
*G10L 15/06* (2013.01)
*G10L 15/22* (2006.01)

(52) U.S. Cl.
CPC ............ *G10L 15/22* (2013.01); *G10L 15/063* (2013.01)

(58) Field of Classification Search
CPC ....... G10L 15/22; G10L 15/063; G10L 14/02; G10L 15/06
See application file for complete search history.

(56) References Cited

U.S. PATENT DOCUMENTS

2004/0023677 A1* 2/2004 Mano ...................... G10L 19/12
                                                                    455/500
2016/0093292 A1    3/2016 Hofer et al.
(Continued)

FOREIGN PATENT DOCUMENTS

CN    103871403 A    6/2014
CN    106503805 A    3/2017
(Continued)

OTHER PUBLICATIONS

International Patent Application No. PCT/CN2022/109381; Int'l Written Opinion and Search Report; dated Nov. 4, 2022; 8 pages.
(Continued)

*Primary Examiner* — Abul K Azad
(74) *Attorney, Agent, or Firm* — BakerHostetler

(57) ABSTRACT

The present disclosure discloses a method and device of generating acoustic features, speech model training, and speech recognition. By acquiring the acoustic information vector of the current speech frame and the information weight of the current speech frame, and according to the accumulated information weight corresponding to the previous speech frame, the retention rate corresponding to the current speech frame, and the information weight of the current speech frame, the accumulated information weight corresponding to the current speech frame can be obtained. The retention rate is the difference between 1 and a leakage rate.

18 Claims, 7 Drawing Sheets

(56) References Cited

U.S. PATENT DOCUMENTS

| | | | |
|---|---|---|---|
| 2017/0011738 A1 | 1/2017 | Senior et al. | |
| 2019/0096433 A1* | 3/2019 | Togawa | G10L 25/18 |
| 2020/0402500 A1* | 12/2020 | Zhao | G10L 15/063 |
| 2021/0193123 A1* | 6/2021 | Huang | G10L 15/063 |
| 2021/0233511 A1 | 7/2021 | Li et al. | |
| 2023/0402031 A1* | 12/2023 | Dong | G10L 15/02 |

FOREIGN PATENT DOCUMENTS

| | | |
|---|---|---|
| CN | 111276131 A | 6/2020 |
| CN | 111653270 A | 9/2020 |
| CN | 111862985 A | 10/2020 |
| CN | 112599122 A | 4/2021 |
| CN | 112786006 A | 5/2021 |
| CN | 113593527 A | 11/2021 |
| EP | 3693966 A1 | 8/2020 |
| JP | H11-003095 A | 1/1999 |
| JP | 2014-081516 A | 5/2014 |
| JP | 2019-061129 A | 4/2019 |
| WO | WO 2017/114201 A1 | 7/2017 |

OTHER PUBLICATIONS

Yu et al.; "Research on Acoustic Model of Speech Recognition Based on Neural Network with Improved Gating Unit"; Journal of Changchun University of Science and Technology—Natural Science Edition; vol. 43 No. 1; Feb. 2020; p. 104-111 (contains English Abstract).

Huang et al.; "Tone Model Integration Using Tree Based Weight Parameter Tying in Mandarin Speech Recognition"; Journal of Xinjiang University—Natural Science Edition; vol. 28 No. 3; Aug. 2011; p. 260-266 (contains English Abstract).

Dong et al.; "CIF: Continuous Integrate-And-Fire For End-To-End Speech Recognition"; IEEE ICASSP; 2020; p. 6079-6083.

* cited by examiner

METHOD AND DEVICE OF GENERATING ACOUSTIC FEATURES, SPEECH MODEL TRAINING, AND SPEECH RECOGNITION

CROSS-REFERENCE TO RELATED APPLICATION

This application is a continuation of International Application No. PCT/CN2022/109381 filed on Aug. 1, 2022, which claims the priority of a Chinese Patent Application No. 202110881723.7 filed on Aug. 2, 2021, and title "a method and device of generating acoustic features, speech model training, speech recognition", both of which are incorporated herein by reference in their entireties.

TECHNICAL FIELD

The present disclosure belongs to the field of data processing technology and specifically relates to a method and device of generating acoustic features, speech model training, and speech recognition.

BACKGROUND

Speech recognition technology refers to the recognition of speech data, and converting the corresponding content of speech data into computer-readable input. For example, through speech recognition technology, the content contained in speech data can be converted into corresponding text, facilitating subsequent processing of the content contained in speech data.

At present, speech models can be used to achieve speech recognition of speech data. The speech model extracts the acoustic features of speech data and processes the acoustic features to obtain text recognition results corresponding to the speech data. However, the recognition results obtained from speech model recognition are not accurate enough to meet the needs of speech recognition.

SUMMARY

In view of this, the embodiments of the present disclosure provide a method and device of generating acoustic features, speech model training, and speech recognition, which can generate more accurate acoustic features, thereby improving the recognition accuracy of the speech model.

Based on this, the technical solution provided by the embodiments of the present disclosure is as follows.

On the first hand, the embodiments of the present disclosure provide a method of generating acoustic features, the method includes:

acquiring an acoustic information vector of a current speech frame and an information weight of the current speech frame;

obtaining an accumulated information weight corresponding to the current speech frame according to an accumulated information weight corresponding to a previous speech frame, a retention rate corresponding to the current speech frame, and an information weight of the current speech frame; the retention rate is a difference between 1 and a leakage rate;

in a case that the accumulated information weight corresponding to the current speech frame is less than a threshold, obtaining an integrated acoustic information vector corresponding to the current speech frame according to an integrated acoustic information vector corresponding to the previous speech frame, the retention rate corresponding to the current speech frame, the information weight of the current speech frame, and the acoustic information vector of the current speech frame;

in a case that the accumulated information weight corresponding to the current speech frame is greater than or equal to the threshold, using the integrated acoustic information vector corresponding to the previous speech frame and the acoustic information vector of the current speech frame to output an issued integrated acoustic information vector, and calculating to obtain the integrated acoustic information vector corresponding to the current speech frame;

after obtaining the integrated acoustic information vector corresponding to the current speech frame, taking a next speech frame as the current speech frame, and repeating a step of acquiring the acoustic information vector of the current speech frame and the information weight of the current speech frame, as well as subsequent steps, until there is no next speech frame.

On the second hand, the embodiments of the present disclosure provide a method of speech model training, the method includes:

inputting training speech data into an encoder to obtain an acoustic information vector of each speech frame;

inputting the acoustic information vector of each speech frame and an information weight of each speech frame into a continuous integrate-and-fire CIF module to obtain an issued integrated acoustic information vector; the CIF module outputs the issued integrated acoustic information vector according to the method of generating acoustic features in any one of the embodiments;

inputting the issued integrated acoustic information vector into a decoder to obtain a word prediction result of the training speech data;

training the encoder, the CIF module, and the decoder according to the word prediction result and a word label corresponding to the training speech data.

On the third hand, the embodiments of the present disclosure provide a method of speech recognition, the method includes:

inputting speech data to be recognized into an encoder to obtain an acoustic information vector of each speech frame;

inputting the acoustic information vector of each speech frame and an information weight of each speech frame into a continuous integrate-and-fire CIF module to obtain an issued integrated acoustic information vector; the CIF module outputs the issued integrated acoustic information vector according to the method of generating acoustic features in any one of the embodiments;

inputting the issued integrated acoustic information vector into a decoder to obtain a word recognition result of the speech data to be recognized.

On the fourth hand, the embodiments of the present disclosure provide a device of generating acoustic features, the device includes:

a first acquisition unit which is used to acquire an acoustic information vector of a current speech frame and an information weight of the current speech frame;

a first calculation unit which is used to obtain an accumulated information weight corresponding to the current speech frame according to an accumulated information weight corresponding to a previous speech frame, a retention rate corresponding to the current speech frame, and the information weight of the current speech frame; the retention rate is a difference between 1 and a leakage rate;

a second calculation unit which is used to obtain an integrated acoustic information vector corresponding to the current speech frame according to the integrated acoustic information vector corresponding to the previous speech frame, the retention rate corresponding to the current speech frame, the information weight of the current speech frame, and the acoustic information vector of the current speech frame, in a case that the accumulated information weight corresponding to the current speech frame is less than a threshold;

a third calculation unit which is used to use the integrated acoustic information vector corresponding to the previous speech frame and the acoustic information vector of the current speech frame to output the issued integrated acoustic information vector, and calculate to obtain the integrated acoustic information vector corresponding to the current speech frame, in a case that the accumulated information weight corresponding to the current speech frame is greater than or equal to the threshold; and an execution unit which is used to take a next speech frame as the current speech frame, repeat a step of acquiring the acoustic information vector of the current speech frame and the information weight of the current speech frame, as well as subsequent steps, until there is no next speech frame after obtaining the integrated acoustic information vector corresponding to the current speech frame.

On the fifth hand, the embodiments of the present disclosure provide a speech model training device, the device includes:

a first training unit which is used to input training speech data into an encoder to obtain an acoustic information vector of each speech frame;

a second training unit which is used to input the acoustic information vector of each speech frame and an information weight of each speech frame into a continuous integrate-and-fire CIF module to obtain an issued integrated acoustic information vector; the CIF module outputs the issued integrated acoustic information vector according to the method of generating acoustic features in any one of the embodiments;

a third training unit which is used to input the issued integrated acoustic information vector into a decoder to obtain a word prediction result of the training speech data; and a fourth training unit which is used to train the encoder, the CIF module, and the decoder according to the word prediction result and a word label corresponding to the training speech data.

On the sixth hand, the embodiments of the present disclosure provide a speech recognition device, the device includes:

a first input unit which is used to input speech data to be recognized into an encoder to obtain an acoustic information vector of each speech frame;

a second input unit which is used to input the acoustic information vector of each speech frame and an information weight of each speech frame into a continuous integrate-and-fire CIF module to obtain an issued integrated acoustic information vector; the CIF module outputs the issued integrated acoustic information vector according to the method of generating acoustic features in any one of the embodiments; and a third input unit which is used to input the issued integrated acoustic information vector into the decoder to obtain a word recognition result of the speech data to be recognized.

On the seventh hand, the embodiments of the present disclosure provide an electronic device, the device includes:
one or more processors; and
a storage device on which one or more programs are stored,
in a case that the one or more programs are executed by one or more processors, the one or more processors are allowed to implement the method of generating acoustic features, the method of speech model training, or the method of speech recognition in any one of the embodiments.

On the eighth hand, the embodiments of the present disclosure provide a computer-readable medium on which a computer program is stored, the program implements the method of generating acoustic features, the method of speech model training, or the method of speech recognition in any one of the embodiments when executed by a processor.

BRIEF DESCRIPTION OF DRAWINGS

The accompanying drawings are used to provide a further understanding of the present disclosure and form a part of the specification. Together with the embodiments of the present disclosure, the accompanying drawings are used to explain the present disclosure and do not constitute a limitation of the present disclosure. In the accompanying drawings.

DETAILED DESCRIPTION

In order to make the above purposes, features, and advantages of the present disclosure more obvious and understandable, the following will provide further detailed explanations of the embodiments of the present disclosure in combination with the accompanying drawings and specific implementation.

To facilitate the understanding of the technical solution provided by the present disclosure, the background technology involved in the present disclosure will be explained below.

Figure 1:
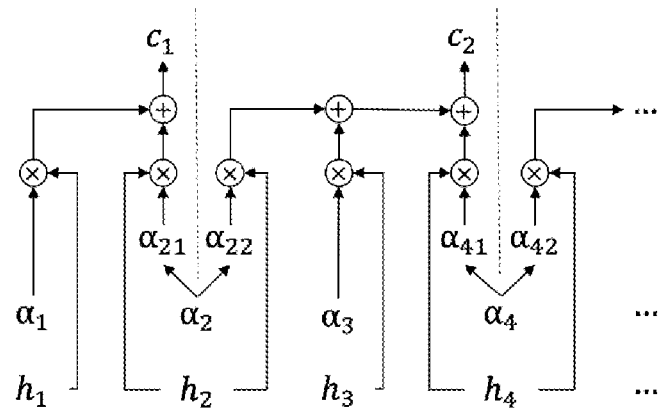
FIG. 1 is a schematic diagram of the CIF generated integrated acoustic information vector provided by the embodiments of the present disclosure.

CIF (Continuous Integrate-and-Fire) method is applied in the encoding and decoding framework. As shown in FIG. 1, this figure is a schematic diagram of the CIF generated integrated acoustic information vector provided by the embodiments of the present disclosure. First, according to the encoding order, the acoustic information vector $H=\{h_1, h_2, \ldots, h_N\}$ of the speech frame output by the encode and the information weight $\alpha=\{\alpha_1, \alpha_2, \ldots, \alpha_N\}$ corresponding to the speech frame are sequentially received to accumulate the information weight of the speech frame. N is the total number of speech frames in the speech data. After the information weight of the accumulated speech frame reaches the threshold, locate the acoustic boundary. Integrate the acoustic information vector of speech frames in a weighted sum manner to obtain the integrated acoustic information vector $C=\{c_1, c_2, \ldots, c_M\}$. M is the total number of integrated acoustic information vectors. After studying the traditional CIF method, it was found that speech frames with small information weight will affect the accuracy of the obtained integrated acoustic information vector.

Based on this, the embodiments of the present disclosure provide a method and device of generating acoustic features, speech model training, and speech recognition. By acquiring the acoustic information vector of the current speech frame and the information weight of the current speech frame, multiplying the accumulated information weight corresponding to the previous speech frame by the retention rate corresponding to the current speech frame, and then adding the information weight of the current speech frame, the accumulated information weight corresponding to the current speech frame can be obtained. The retention rate is the difference between 1 and a leakage rate. Adjusting the accumulated information weight corresponding to the current speech frame and the integrated acoustic information vector corresponding to the current speech frame by using the leakage rate can reduce the impact of speech frames with smaller information weight on the integrated acoustic information vector, thereby increasing the proportion of the acoustic information vector of speech frames with larger information weight in the integrated acoustic information vector, making the obtained integrated acoustic information vector more accurate. This can enable the speech model to extract more accurate acoustic features and improve the accuracy of the speech model.

Figure 2:
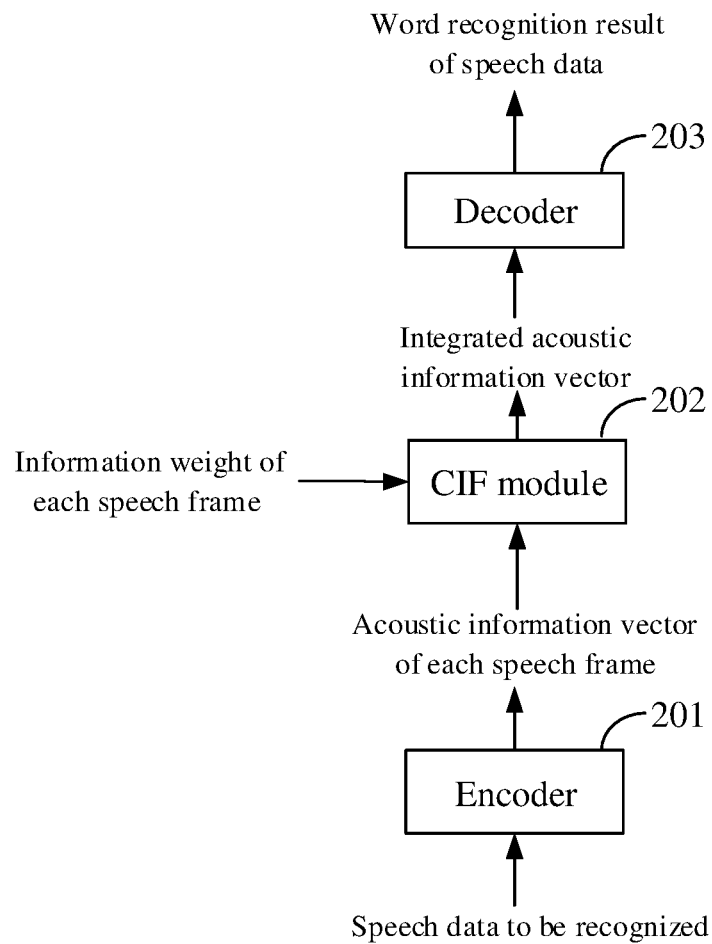
FIG. 2 is a framework diagram of the exemplary application scenario provided by the embodiments of the present disclosure.

In order to facilitate the understanding of a method of speech recognition provided by the embodiments of the present disclosure, the following will illustrate in conjunction with the exemplary application scenario shown in FIG. 1. As shown in FIG. 2, this figure is a framework diagram of the exemplary application scenario provided by the embodiments of the present disclosure.

In practical applications, the speech data to be recognized is input into the encoder 201 to obtain acoustic information vector of each speech frame. Then the acoustic information vector of each speech frame and the information weight of each speech frame are input into the CIF module 202 to obtain the integrated acoustic information vector output by CIF module 202. Finally, the integrated acoustic information vector is input into the decoder 203 to obtain the word recognition result of the speech data to be recognized.

Those skilled in the art can understand that the frame diagram shown in FIG. 2 is only one example in which the embodiments of the present disclosure can be implemented. The application scope of the embodiments of the present disclosure is not limited by any aspect of the frame.

Based on the above explanation, the following will provide a detailed explanation of the method of generating acoustic features provided by the present disclosure in conjunction with the accompanying drawings.

Figure 3:
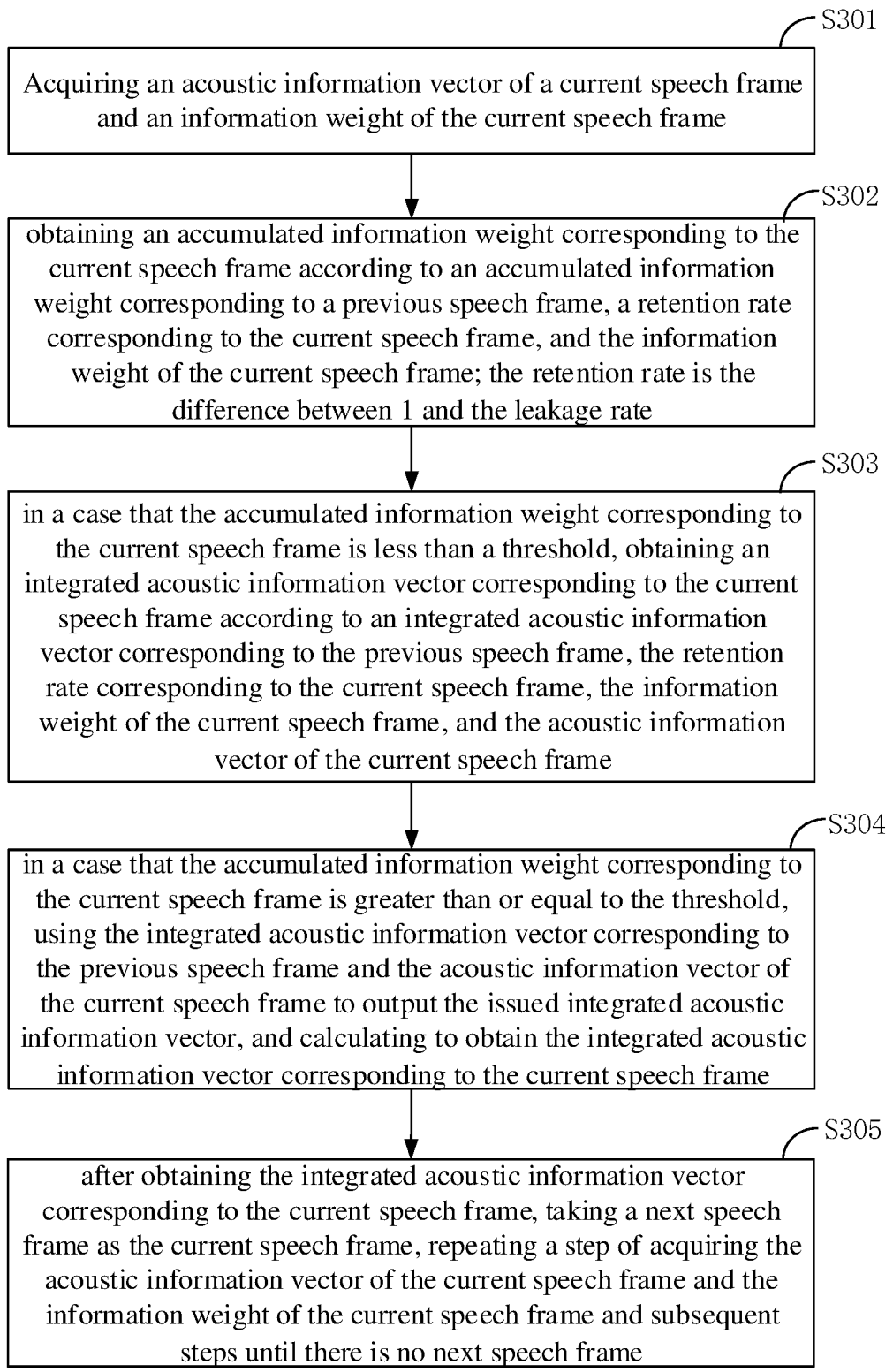
FIG. 3 is a flowchart of a method of generating acoustic features provided by the embodiments of the present disclosure.

As shown in FIG. 3, this figure is a flowchart of a method of generating acoustic features provided by the embodiments of the present disclosure. This method includes steps S301-S305.

S301: acquiring an acoustic information vector of a current speech frame and an information weight of the current speech frame.

When using the model of the CIF based encoding and decoding framework to process speech data, the encoder performs feature extraction on the input speech data frame by frame and obtains the acoustic information vector of the speech frame. The acoustic information vector of the speech frame is a high-dimensional representation of the speech data. Each speech frame has a corresponding information weight. The information weight is used to measure the information amount included in the speech frame.

When the encoder processes the input speech data, it generates the acoustic information vector of each speech frame in the speech data. The acoustic information vector of the generated speech frame and the information weight of the speech frame are processed in sequence.

The speech frame that is currently processed is taken as the current speech frame, and the acoustic information vector of the current speech frame and the information weight of the current speech frame are acquired.

For example, the u-th speech frame in the speech data is taken as the current speech frame, where u is a positive integer less than N, and N is the total number of speech frames in the speech data. The acoustic information vector of the current speech frame is represented as $h_u$, and the information weight of the current speech frame is $\alpha_u$.

S302: obtaining an accumulated information weight corresponding to the current speech frame according to an accumulated information weight corresponding to a previous speech frame, a retention rate corresponding to the current speech frame, and the information weight of the current speech frame; the retention rate is the difference between 1 and the leakage rate.

By utilizing the retention rate corresponding to the current speech frame, the accumulated information weight corresponding to the previous speech frame, and the information weight of the current speech frame, the adjusted accumulated information weight corresponding to the current speech frame which is obtained by adjusting the retention rate corresponding to the current speech frame can be obtained. The retention rate is the difference between 1 and the leakage rate. The leakage rate is used to represent the ratio of information weight leakage. The range of leakage rate is [0,1]. The retention rate is the difference between 1 and the leakage rate and is used to represent the ratio of information weight retention.

In one possible implementation, the embodiments of the present disclosure provide a specific implementation for obtaining the accumulated information weight corresponding to the current speech frame according to the accumulated information weight corresponding to the previous speech frame, the retention rate corresponding to the current speech frame, and the information weight of the current speech frame. Please refer to the following for details.

S303: in a case that the accumulated information weight corresponding to the current speech frame is less than a threshold, obtaining an integrated acoustic information vector corresponding to the current speech frame according to an integrated acoustic information vector corresponding to the previous speech frame, the retention rate corresponding to the current speech frame, the information weight of the current speech frame, and the acoustic information vector of the current speech frame.

Compare the accumulated information weight corresponding to the current speech frame with the threshold, in a case that the accumulated information weight corresponding to the current speech frame is less than the threshold, it is necessary to continue accumulating the information weight corresponding to the next speech frame. The threshold can be set according to the need to determine the acoustic boundary, for example, the threshold may be 1.

The accumulated information weight corresponding to the current speech frame is relatively small. Based on the integrated acoustic information vector corresponding to the previous speech frame, the retention rate corresponding to the current speech frame, the information weight of the current speech frame, and the acoustic information vector of the current speech frame, the integrated acoustic information vector corresponding to the current speech frame is obtained. The obtained integrated acoustic information vector corresponding to the current speech frame is obtained by adjusting by using the retention rate corresponding to the current speech frame.

In one possible implementation, the embodiments of the present disclosure provide a specific implementation for obtaining the integrated acoustic information vector corresponding to the current speech frame according to the integrated acoustic information vector corresponding to the previous speech frame, the retention rate corresponding to the current speech frame, the information weight of the current speech frame, and the acoustic information vector of the current speech frame, in a case that the accumulated information weight corresponding to the current speech frame is less than the threshold. Please refer to the following for details.

S304: in a case that the accumulated information weight corresponding to the current speech frame is greater than or equal to the threshold, using the integrated acoustic information vector corresponding to the previous speech frame and the acoustic information vector of the current speech frame to output the issued integrated acoustic information vector, and calculating to obtain the integrated acoustic information vector corresponding to the current speech frame.

In the case that the accumulated information weight corresponding to the current speech frame is greater than or equal to the threshold, the acoustic information vectors of the speech frames can be integrated to obtain the output issued integrated acoustic information vector.

The issued integrated acoustic information vector is obtained from the integrated acoustic information vector corresponding to the previous speech frame and the acoustic information vector of the current speech frame.

In one possible implementation, the embodiments of the present disclosure provide a specific implementation for using the integrated acoustic information vector corresponding to the previous speech frame and the acoustic information vector of the current speech frame to output the issued integrated acoustic information vector, and calculating to obtain the integrated acoustic information vector corresponding to the current speech frame, in the case that the accumulated information weight corresponding to the current speech frame is greater than or equal to the threshold. Please refer to the following for details.

S305: after obtaining the integrated acoustic information vector corresponding to the current speech frame, taking a next speech frame as the current speech frame, repeating a step of acquiring the acoustic information vector of the current speech frame and the information weight of the current speech frame and subsequent steps until there is no next speech frame.

Take the next speech frame as the current speech frame and repeat the above S301 and subsequent steps, that is, the step of acquiring the acoustic information vector of the current speech frame and the information weight of the current speech frame as well as subsequent steps, until there is no next speech frame, that is, stop after processing all speech frames of the speech data.

Based on the relevant contents of S301-S305 above, it can be seen that adjusting the accumulated information weight corresponding to the current speech frame and the integrated acoustic information vector corresponding to the current speech frame by using leakage rate can reduce the impact of speech frames with smaller information weight on the integrated acoustic information vector, thereby increasing the proportion of the acoustic information vector of the speech frame with larger information weight in the integrated acoustic information vector, making the integrated acoustic information vector that is obtained more accurate. Multiply the accumulated information weight corresponding to the previous speech frame by the retention rate corresponding to the current speech frame to obtain the retained accumulated information weight. Then add the retained accumulated information weight to the information weight of the current speech frame to obtain the accumulated information weight corresponding to the current speech frame.

Take the current speech frame as an example. The accumulated information weight corresponding to the current speech frame can be represented by the following equation:

$$\hat{\alpha}_u = (1-\hat{R})\hat{\alpha}_{u-1} + \hat{\alpha}_u \qquad (1)$$

$\hat{\alpha}_u$, represents the accumulated information weight corresponding to the current speech frame, R is the leakage rate, $\hat{\alpha}_{u-1}$ represents the accumulated information weight corresponding to the previous speech frame, and $\alpha_u$ represents the information weight of the current speech frame. In one possible implementation, the embodiments of the present disclosure provide a specific implementation for obtaining the integrated acoustic information vector corresponding to the current speech frame according to the integrated acoustic information vector corresponding to the previous speech frame, the retention rate corresponding to the current speech frame, the information weight of the current speech frame, and the acoustic information vector of the current speech frame, in the case that the accumulated information weight corresponding to the current speech frame is less than the threshold. The specific implementation specifically includes:

in a case that the accumulated information weight corresponding to the current speech frame is less than the threshold, multiply the integrated acoustic information vector corresponding to the previous speech frame by the retention rate corresponding to the current speech frame, and then add the product of the information weight of the current speech frame and the acoustic information vector of the current speech frame to obtain the integrated acoustic information vector corresponding to the current speech frame.

Multiply the integrated acoustic information vector corresponding to the previous speech frame by the retention rate corresponding to the current speech frame, then multiply the information weight of the current speech frame by the acoustic information vector of the current speech frame, and finally add the obtained two products to obtain the integrated acoustic information vector corresponding to the current speech frame.

The integrated acoustic information vector corresponding to the current speech frame can be represented by the following equation:

$$\hat{h}_u = (1-R)\hat{h}_{u-1} + \alpha_u * h_u \quad (2)$$

$\hat{h}_u$ represents the integrated acoustic information vector corresponding to the current speech frame, R is the leakage rate, $\hat{h}_{u-1}$ represents the integrated acoustic information vector corresponding to the previous speech frame, a u represents the information weight of the current speech frame, and h u represents the acoustic information vector of the current speech frame.

Furthermore, the embodiments of the present disclosure provide a specific implementation for using the integrated acoustic information vector corresponding to the previous speech frame and the acoustic information vector of the current speech frame to output the issued integrated acoustic information vector, in the case that the accumulated information weight corresponding to the current speech frame is greater than or equal to the threshold. The implementation specifically includes the following two steps.

A1: In the case that the accumulated information weight corresponding to the current speech frame is greater than or equal to the threshold, calculating the accumulated information weight corresponding to the previous speech frame being multiplied by the retention rate corresponding to the current speech frame to obtain the first value, and calculating the difference between 1 and the first value to obtain the first part of the information weight of the current speech frame.

When the accumulated information weight corresponding to the current speech frame is greater than or equal to the threshold, the acoustic boundary can be located in the current speech frame to obtain the corresponding integrated acoustic information vector.

The first part of the information weight of the current speech frame is determined according to the accumulated information weight corresponding to the previous speech frame.

Multiply the accumulated information weight corresponding to the previous speech frame by the retention rate corresponding to the current speech frame to obtain the first value. Calculate the difference between 1 and the first value to obtain the first part of the information weight of the current speech frame.

The first part of the information weight of the current speech frame can be represented by the following equation:

$$\alpha_{u1} = 1 - (1-R)\hat{\alpha}_{u-1} \quad (3)$$

R is the leakage rate, $\hat{\alpha}_{u-1}$ represents the accumulated information weight corresponding to the previous speech frame.

A2: Multiplying the integrated acoustic information vector corresponding to the previous speech frame by the retention rate corresponding to the current speech frame, and then adding the product of the first part of the information weight of the current speech frame and the acoustic information vector of the current speech frame to obtain the issued integrated acoustic information vector.

The issued integrated acoustic information vector includes the part of the integrated acoustic information vector corresponding to the previous speech frame and the part of the acoustic information vector of the current speech frame.

Multiply the integrated acoustic information vector corresponding to the previous speech frame by the retention rate corresponding to the current speech frame. Multiply the first part of the information weight of the current speech frame by the acoustic information vector of the current speech frame. Then add the obtained two products to obtain the issued integrated acoustic information vector.

The issued integrated acoustic information vector can be represented by the following equation:

$$C_i = (1-R)\hat{h}_{u-1} + \alpha_{u1} * h_u \quad (4)$$

(1−R) represents the retention rate corresponding to the current speech frame, $\hat{h}_{u-1}$ represents the integrated acoustic information vector corresponding to the previous speech frame, $\alpha_{u1}$ represents the first part of the information weight of the current speech frame, and $h_u$ represents the acoustic information vector of the current speech frame.

Based on the above content, it can be seen that adjusting the integrated acoustic information vector corresponding to the previous speech frame and the first part of the information weight of the current speech frame by using the leakage rate can further reduce the impact of the integrated acoustic information vector of the speech frame with lower information weight on the issued integrated acoustic information vector, making the obtained issued integrated acoustic information vector more accurate.

After using the first part of the information weight of the current speech frame to obtain the issued integrated acoustic information vector, there are still parts of the current speech frame that have not been integrated into the issued integrated acoustic information vector. It is necessary to determine the integrated acoustic information vector corresponding to the current speech frame according to the first part of the information weight of the current speech frame.

Furthermore, the embodiments of the present disclosure also provide a specific implementation for calculating the integrated acoustic information vector corresponding to the current speech frame, which includes the following two steps.

B1: calculating the difference between the information weight of the current speech frame and the first part of the information weight of the current speech frame to obtain the second part of the information weight of the current speech frame, and taking the second part of the information weight of the current speech frame as the accumulated information weight of the current speech frame.

The second part of the information weight of the current speech frame is obtained according to the difference between the information weight of the current speech frame and the first part of the information weight of the current speech frame. That is to say, the information weight, not used for integration to obtain the issued integrated acoustic information vector, in the current speech frame is taken as the second part of the information weight.

The accumulated information weight of the current speech frame is the information weight, in the current speech frame, that can be integrated with subsequent speech frames. The second part of the information weight of the current speech frame is taken as the accumulated information weight of the current speech frame.

The accumulated information weight $\hat{\alpha}_u$ of the current speech frame can be represented by the following equation:

$$\hat{\alpha}_u = \alpha_{u2} = \alpha_u - \alpha_{u1} \quad (5)$$

$\alpha_{u2}$ is the second part of the information weight of the current speech frame, and $\alpha_{u1}$ is the first part of the information weight of the current speech frame.

B2: calculating the second part of the information weight of the current speech frame being multiplied by the acoustic information vector of the current speech frame to obtain the integrated acoustic information vector corresponding to the current speech frame.

Multiply the second part of the information weight of the current speech frame by the acoustic information vector of the current speech frame to obtain the integrated acoustic information vector corresponding to the current speech frame.

The integrated acoustic information vector corresponding to the current speech frame can be represented by the following equation:

$$\hat{h}_u = \alpha_{u2} * h_u \quad (6)$$

In the embodiments of the present disclosure, the accumulated information weight of the current speech frame is determined based on the first part of the information weight of the current speech frame, and the integrated acoustic information vector corresponding to the current speech frame is determined. This can obtain a more accurate accumulated information weight of the current speech frame, making it easier to integrate with subsequent speech frames.

To illustrate the method of generating acoustic features provided by the above embodiments, the following examples will be given in conjunction with specific scenarios.

Figure 4:
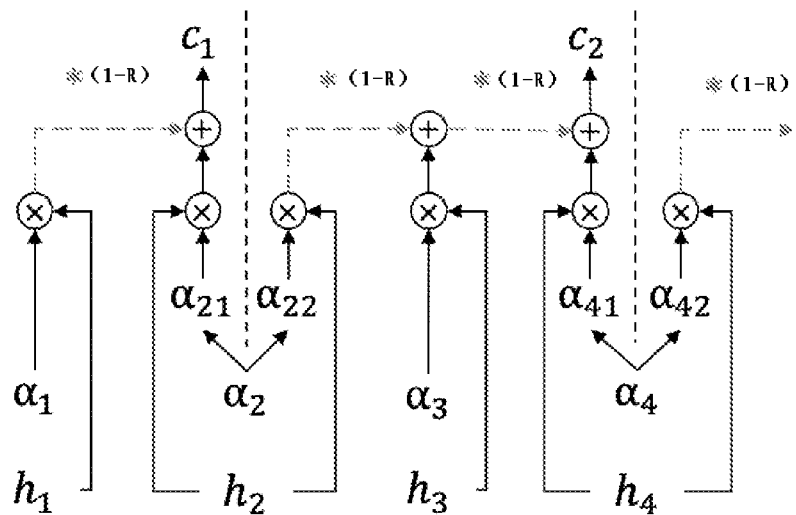
FIG. 4 is a schematic diagram of a method of generating acoustic features provided by the embodiments of the present disclosure.

As shown in FIG. 4, this figure is a schematic diagram of a method of generating acoustic features provided by the embodiments of the present disclosure. The acoustic information vector of each speech frame output by the encoder is $H = \{h_1, h_2, h_3, h_4\}$, and the information weight corresponding to each speech frame is $\alpha = \{\alpha_1, \alpha_2, \alpha_3, \alpha_4\} = \{0.2, 0.9, 0.6, 0.6\}$.

The current speech frame is the first speech frame, i.e. u=1. The acquired acoustic information vector of the current speech frame is h1, and the corresponding information weight is $\alpha_1$. The first speech frame does not have the previous speech frame, and the calculation formula for the accumulated information weight $\hat{\alpha}_1$ corresponding to the current speech frame is as follows:

$$\hat{\alpha}_1 = \alpha_1 = 0.2 \quad (7)$$

Under the premise of the threshold being 1, the accumulated information weight corresponding to the current speech frame is less than the threshold. Calculate the integrated acoustic information vector corresponding to the current speech frame, the integrated acoustic information vector $\hat{h}_1$ corresponding to the current speech frame can be represented as:

$$\hat{h}_1 = \alpha_1 * h_1 = 0.2 * h_1 \quad (8)$$

Take the next speech frame as the current speech frame, i.e., u=2. Acquire the acoustic information vector $h_2$ of the current speech frame and the information weight $\alpha_2$ of the current speech frame. Determine the accumulated information weight $\hat{\alpha}_2$ corresponding to the current speech frame.

$$\hat{\alpha}_2 = (1-R)\hat{\alpha}_1 + \alpha_2 = 0.9 * 0.2 + 0.9 = 1.08 \quad (9)$$

R is the leakage rate corresponding to the current speech frame, and the value of R is 0.1.

The accumulated information weight $\hat{\alpha}_2$ corresponding to the current speech frame is greater than the threshold. The integrated acoustic information vector $\hat{h}_1$ corresponding to the previous speech frame and the acoustic information vector $\hat{h}_2$ of the current speech frame are used to output the issued integrated acoustic information vector $C_1$.

First, calculate the first part of the information weight $\alpha_{21}$ of the current speech frame, which can be represented by the following equation:

$$\alpha_{21} = 1 - (1-R)\hat{\alpha}_1 = 1 - 0.9 * 0.2 = 0.82 \quad (10)$$

The integrated acoustic information vector $C_1$ can be represented by the following equation:

$$C_1 = (1-R)\hat{h}_1 + \alpha_{21} * h_2 = 0.18 * h_1 + 0.82 * h_2 \quad (11)$$

Then, recalculate the accumulated information weight $\hat{\alpha}_2$ corresponding to the current speech frame, which can be represented by the following equation:

$$\hat{\alpha}_2 = \alpha_{22} = \alpha_2 - \alpha_{21} = 0.08 \quad (12)$$

The integrated acoustic information vector $\hat{h}_2$ corresponding to the current speech frame can be represented as:

$$\hat{h}_2 = \alpha_{22} * h_2 = 0.08 * h_2 \quad (13)$$

Then, take the next speech frame as the current speech frame, i.e., u=3. Acquire the acoustic information vector $h_3$ of the current speech frame and the information weight $\alpha_3$ of the current speech frame.

Then, calculate the accumulated information weight $\hat{\alpha}_3$ corresponding to the current speech frame. $\hat{\alpha}_3$ can be expressed as:

$$\hat{\alpha}_3 = (1-R)\hat{\alpha}_2 + \alpha_3 = 0.9 * 0.08 + 0.6 = 0.672 \quad (14)$$

In the case that the accumulated information weight corresponding to the current speech frame is less than the threshold, calculate the integrated acoustic information vector $\hat{h}_3$ corresponding to the current speech frame.

$$\hat{h}_3 = 0.9\hat{h}_2 + \alpha_3 * h_3 = 0.072 * h_2 + 0.6 * h_3 \quad (15)$$

Take the next speech frame as the current speech frame, i.e., u=4. Acquire the acoustic information vector $h_4$ of the current speech frame and the information weight $\alpha_4$ of the current speech frame.

Calculate the accumulated information weight $\hat{\alpha}_4$ corresponding to the current speech frame.

$$\overline{\alpha}_4 = (1-R)\hat{\alpha}_3 + \alpha_4 = 0.9 * 0.672 + 0.6 = 1.2048 \quad (16)$$

In the case that the accumulated information weight corresponding to the current speech frame is greater than or equal to the threshold, calculate the integrated acoustic information vector C2.

The first part of the information weight $\alpha_{41}$ of the current speech frame can be represented by the following equation:

$$\alpha_{41} = 1 - (1-R)\hat{\alpha}_3 = 0.3952 \quad (17)$$

The issued integrated acoustic information vector C2 can be represented by the following equation:

$$C_2 = (1-R)\hat{h}_3 + \alpha_{41} * h_4 = 0.9*(0.072*h_2 + 0.6*h_3) + 0.3952*h_4 = 0.0648*h_2 + 0.54*h_3 + 0.3952*h_4 \quad (18)$$

After the fourth speech frame, there are no other speech frames, the generation of the integrated acoustic information vector ends.

In one possible implementation, the leakage rate of the current speech frame is adjustable. The leakage rate of the current speech frame can be determined using a predictive model.

Based on this, the embodiments of the present disclosure further provide a method of generating acoustic features, which includes the following steps in addition to the above steps.

Inputting the acoustic information vector of the current speech frame and the integrated acoustic information vector corresponding to the previous speech frame into the predictive model to acquire the leakage rate of the current speech frame.

The predictive model can output the leakage rate of the current speech frame according to the acoustic information vector of the input current speech frame and the integrated acoustic information vector corresponding to the previous speech frame. The leakage rate range of the current speech frame is [0,1].

The predictive model may be a neural network layer in the speech model, for example, it may be a fully connected layer or a convolutional layer, and the activation function is sigmoid. The predictive model can be obtained by being trained together with the speech model. The model parameters of the predictive model are adjusted in the process of training the speech model.

Based on the above content, it can be seen that using the predictive model to obtain the leakage rate of the current speech frame can make the leakage rate of the speech frame more accurate, thereby improving the accuracy of the obtained issued integrated acoustic information vector.

In one possible implementation, it is possible to have a leakage rate of 0 corresponding to the current speech frame for every interval of N speech frames.

In the embodiments of the present disclosure, by adjusting the leakage rate of some of the speech frames to 0, it is possible to reduce computation amount and improve the efficiency of generating integrated acoustic information vectors while improving the accuracy of the issued integrated acoustic information vector.

Figure 5:
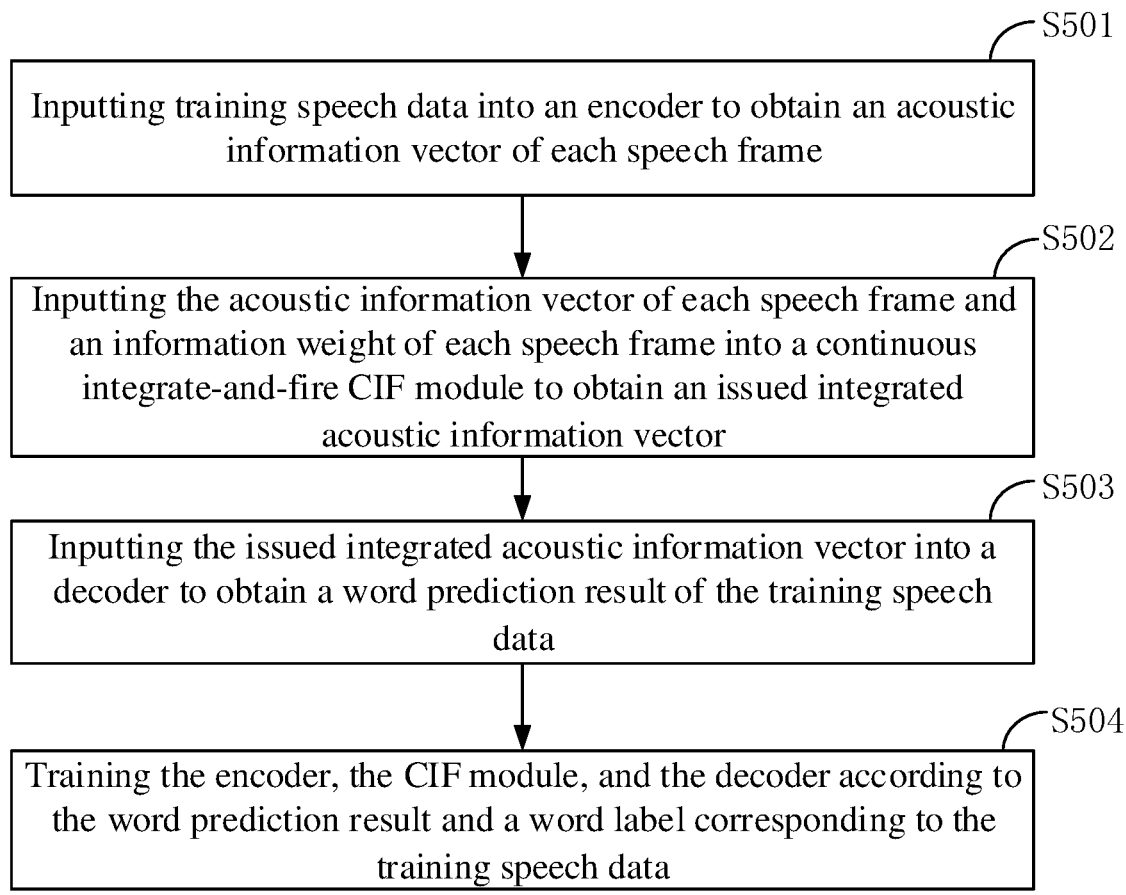
FIG. 5 is a flowchart of a method of speech model training provided by the embodiments of the present disclosure.

Based on the method of generating acoustic features provided by the above embodiments, the embodiments of the present disclosure also provide a speech model training method. As shown in FIG. 5, this figure is a flowchart of a speech model training method provided by the embodiments of the present disclosure, which includes steps S501-S504.

S501: Inputting training speech data into an encoder to obtain an acoustic information vector of each speech frame.

The training speech data is used to train the acoustic model and determine model parameters in the acoustic model. The training speech data has a corresponding word label.

For example, when the training speech data is the speech data corresponding to "Hello", the word label corresponding to the training speech data is "Hello".

Input the training speech data into the encoder to obtain the acoustic information vector of each speech frame output by the encoder.

S502: Inputting the acoustic information vector of each speech frame and an information weight of each speech frame into a continuous integrate-and-fire CIF module to obtain an issued integrated acoustic information vector.

Then input the acoustic information vector of each speech frame output by the encoder and the information weight of each speech frame into the CIF module to obtain the integrated acoustic information vector issued by the CIF module. The CIF module uses the method of generating acoustic features in the above embodiment to obtain the issued integrated acoustic information vector.

S503: Inputting the issued integrated acoustic information vector into a decoder to obtain a word prediction result of the training speech data.

Then input the obtained issued integrated acoustic information vector into the decoder to obtain the word prediction result of the training speech data output by the decoder.

S504: Training the encoder, the CIF module, and the decoder according to the word prediction result and a word label corresponding to the training speech data.

The word label corresponding to the training speech data is the correct word corresponding to the training speech data. According to the word prediction result output by the speech model and the word label corresponding to the training speech data, the speech model is trained. The speech model is composed of the encoder, the CIF module, and the decoder.

Based on the relevant content of S501-S504 mentioned above, it can be seen that by using the method of generating acoustic features mentioned above, the integrated acoustic information vector output by the CIF module is more accurate, resulting in more accurate word prediction result decoded by the decoder. The trained speech model has higher accuracy and better performance.

Figure 6:
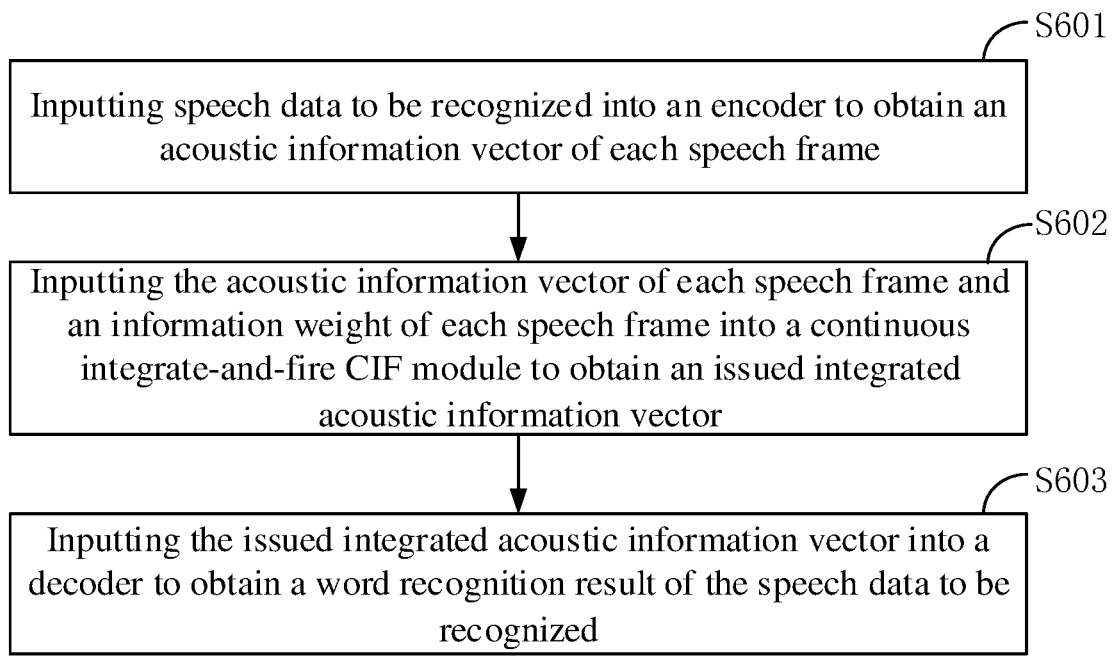
FIG. 6 is a flowchart of a method of speech recognition provided by the embodiments of the present disclosure.

Based on the speech model training method provided by the above embodiment, the embodiments of the present disclosure also provide a speech recognition method. As shown in FIG. 6, this figure is a flowchart of a speech recognition method provided by the embodiments of the present disclosure, which includes steps S601-S603.

S601: Inputting speech data to be recognized into an encoder to obtain an acoustic information vector of each speech frame.

The speech data to be recognized is the speech data that needs to be recognized to obtain the word recognition result. Input the speech data to be recognized into the encoder to obtain the acoustic information vector of each speech frame output by the encoder.

S602: Inputting the acoustic information vector of each speech frame and an information weight of each speech frame into a continuous integrate-and-fire CIF module to obtain an issued integrated acoustic information vector.

Then input the acoustic information vector of each speech frame and the information weight of each speech frame into the CIF module to obtain the integrated acoustic information vector output by the CIF module. The CIF module uses the method of generating acoustic features in the above embodiments to obtain the issued integrated acoustic information vector.

S603: Inputting the issued integrated acoustic information vector into a decoder to obtain a word recognition result of the speech data to be recognized.

Finally, input the issued integrated acoustic information vector into the decoder to obtain the word recognition result of the speech data to be recognized output by the decoder. The word recognition result is the recognition result of the speech data to be recognized output by the speech model.

Based on the relevant content of S601-S603 mentioned above, it can be seen that by using the method of generating acoustic features mentioned above, the integrated acoustic information vector output by the CIF module is more accurate, making the word prediction result obtained by the decoder more accurate. The speech model has higher accuracy and better performance.

Based on the method of generating acoustic features provided by the above method embodiments, the embodiments of the present disclosure also provide a device of generating acoustic features. The device of generating acoustic features will be explained in conjunction with the attached drawings.

Figure 7:
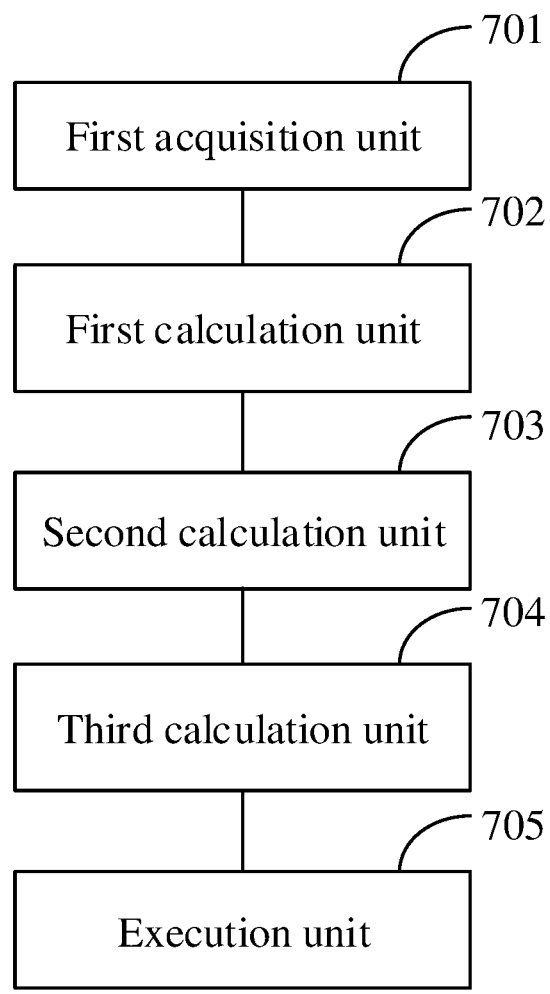
FIG. 7 is a structural schematic diagram of a device of generating acoustic features provided by the embodiments of the present disclosure.

As shown in FIG. 7, this figure is a structural schematic diagram of a device of generating acoustic features provided by the embodiments of the present disclosure. As shown in FIG. 7, the device of generating acoustic features includes:

- a first acquisition unit 701 which is used to acquire the acoustic information vector of the current speech frame and the information weight of the current speech frame;
- a first calculation unit 702 which is used to obtain the accumulated information weight corresponding to the current speech frame according to the accumulated information weight corresponding to the previous speech frame, the retention rate corresponding to the current speech frame, and the information weight of the current speech frame; in which the retention rate is the difference between 1 and the leakage rate;
- a second calculation unit 703 which is used to obtain the integrated acoustic information vector corresponding to the current speech frame according to the integrated acoustic information vector corresponding to the previous speech frame, the retention rate corresponding to the current speech frame, the information weight of the current speech frame, and the acoustic information vector of the current speech frame, in a case that the accumulated information weight corresponding to the current speech frame is less than the threshold;
- a third calculation unit 704 which is used to output the issued integrated acoustic information vector by using the integrated acoustic information vector corresponding to the previous speech frame and the acoustic information vector of the current speech frame, and calculate to obtain the integrated acoustic information vector corresponding to the current speech frame, in a case that the accumulated information weight corresponding to the current speech frame is greater than or equal to the threshold; and
- an execution unit 705 which is used to take the next speech frame as the current speech frame after obtaining the integrated acoustic information vector corresponding to the current speech frame, repeat the step of the acquiring the acoustic information vector of the current speech frame and the information weight of the current speech frame and subsequent steps until there is no next speech frame.

In one possible implementation, the first calculation unit 702 is specifically used to multiply the accumulated information weight corresponding to the previous speech frame by the retention rate corresponding to the current speech frame, and then add the information weight of the current speech frame to obtain the accumulated information weight corresponding to the current speech frame.

In one possible implementation, the second calculation unit 703 is specifically used to multiply the integrated acoustic information vector corresponding to the previous speech frame by the retention rate corresponding to the current speech frame, and then add the product of the information weight of the current speech frame and the acoustic information vector of the current speech frame to obtain the integrated acoustic information vector corresponding to the current speech frame, in a case that the accumulated information weight corresponding to the current speech frame is less than the threshold.

In one possible implementation, the third calculation unit 704 includes:

- a first calculation sub-unit which is used to calculate the accumulated information weight corresponding to the previous speech being multiplied by the retention rate corresponding to the current speech frame, to obtain the first value, and calculate the difference between 1 and the first value, to obtain the first part of the information weight of the current speech frame, in a case that the accumulated information weight corresponding to the current speech frame is greater than or equal to the threshold; and
- a second calculation sub-unit which is used to multiply the integrated acoustic information vector corresponding to the previous speech frame by the retention rate corresponding to the current speech frame, and then add the product of the first part of the information weight of the current speech frame and the acoustic information vector of the current speech frame to obtain the issued integrated acoustic information vector.

In one possible implementation, the third calculation unit 704 includes:

- a third calculation sub-unit which is used to calculate the difference between the information weight of the current speech frame and the first part of the information weight of the current speech frame to obtain the second part of the information weight of the current speech frame, and take the second part of the information weight of the current speech frame as the accumulated information weight of the current speech frame; and
- a fourth calculation sub-unit which is used to calculate the second part of the information weight of the current speech frame being multiplied by the acoustic information vector of the current speech frame, and obtain the integrated acoustic information vector corresponding to the current speech frame.

In one possible implementation, the device further includes:

- a second acquisition unit which is used to input the acoustic information vector of the current speech frame and the integrated acoustic information vector corresponding to the previous speech frame into the predictive model to obtain the leakage rate of the current speech frame.

In one possible implementation, the leakage rate corresponding to the current speech frame is 0 for every interval of N speech frames.

Based on the speech model training provided by above method embodiments, the embodiments of the present disclosure also provide a speech model training device. The following will explain the speech model training device in conjunction with the attached drawings.

Figure 8:
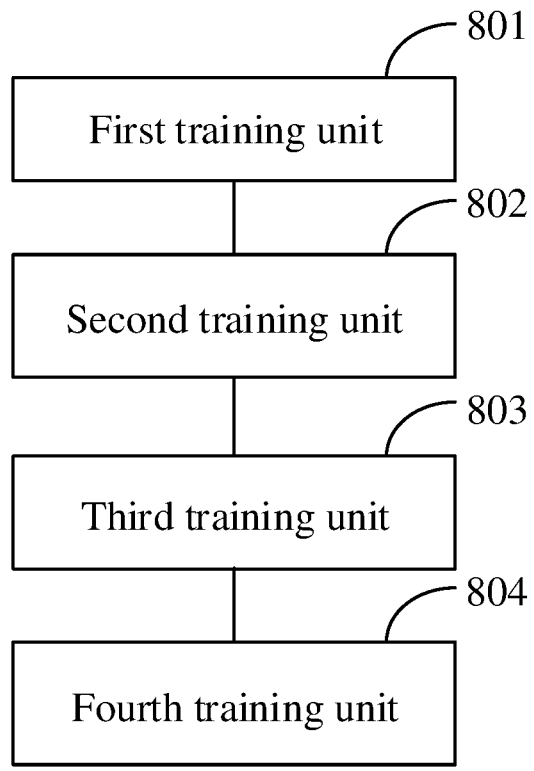
FIG. 8 is a structural schematic diagram of a speech model training device provided by the embodiments of the present disclosure.

As shown in FIG. 8, this figure is a structural schematic diagram of a speech model training device provided by the embodiments of the present disclosure. As shown in FIG. 8, the speech model training device includes:

- a first training unit 801 which is used to input the training speech data into the encoder to obtain the acoustic information vector of each speech frame;
- a second training unit 802 which is used to input the acoustic information vector of each speech frame and the information weight of each speech frame into the continuous integrate-and-fire CIF module to obtain the issued integrated acoustic information vector; the CIF module outputs the issued integrated acoustic information vector according to the method of generating acoustic features according to any of the above embodiments;

a third training unit 803 which is used to input the issued integrated acoustic information vector into the decoder to obtain the word prediction result of the training speech data; and a fourth training unit 804 which is used to train the encoder, the CIF module, and the decoder according to the word prediction result and the word label corresponding to the training speech data.

Based on the method of speech recognition provided by the above method embodiments, the embodiments of the present disclosure also provide a speech recognition device. The following will explain the speech recognition device in conjunction with the accompanying drawings.

Figure 9:
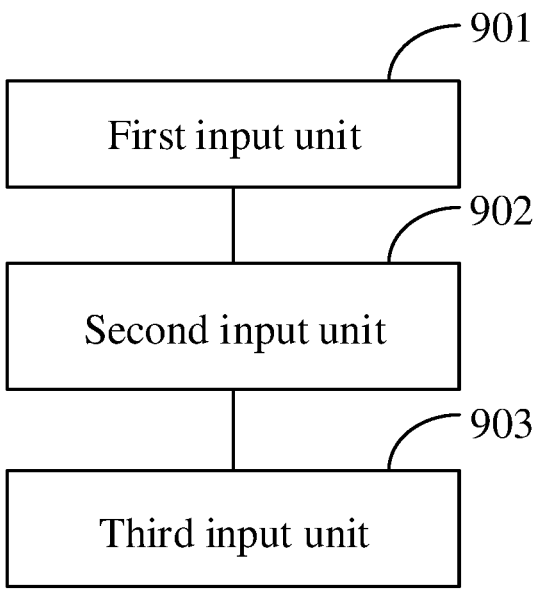
FIG. 9 is a structural schematic diagram of a speech recognition device provided by the embodiments of the present disclosure.

As shown in FIG. 9, this figure is a structural schematic diagram of a speech recognition device provided by the embodiments of the present disclosure. As shown in FIG. 9, the speech recognition device includes:

a first input unit 901 which is used to input the speech data to be recognized into the encoder to obtain the acoustic information vector of each speech frame;

a second input unit 902 which is used to input the acoustic information vector of each speech frame and the information weight of each speech frame into the continuous integrate-and-fire CIF module to obtain the issued integrated acoustic information vector; the CIF module outputs the issued integrated acoustic information vector according to the method of generating acoustic features according to any of the above embodiments; and a third input unit 903 which is used to input the issued integrated acoustic information vector into the decoder to obtain the word recognition result of the speech data to be recognized.

Based on the method of generating acoustic features, the method of speech model training, and the method of speech recognition provided by the above method embodiments, the present disclosure also provides an electronic device. The electronic device includes: one or more processors; and a storage device on which one or more programs are stored. When the one or more programs are executed by the one or more processors, the one or more processors are allowed to implement the method of generating acoustic features, the method of speech model training, or the method of speech recognition as described in any of the above embodiments.

In the following, referring to FIG. 10, a structural schematic diagram of the electronic device 1000 suitable for implementing the embodiments of the present disclosure is shown. The terminal devices in the embodiments of this disclosure may include, but are not limited to, mobile terminals such as mobile phones, laptops, digital broadcasting receivers, PDA (Personal Digital Assistant), PAD (portable android device), PMP (Portable Media Player), vehicle terminals (for example, vehicle navigation terminals), as well as fixed terminals such as digital TV (television) and desktop computers. The electronic device shown in FIG. 10 is only an example and should not impose any limitations on the functionality and usage scope of the embodiments of the present disclosure.

Figure 10:
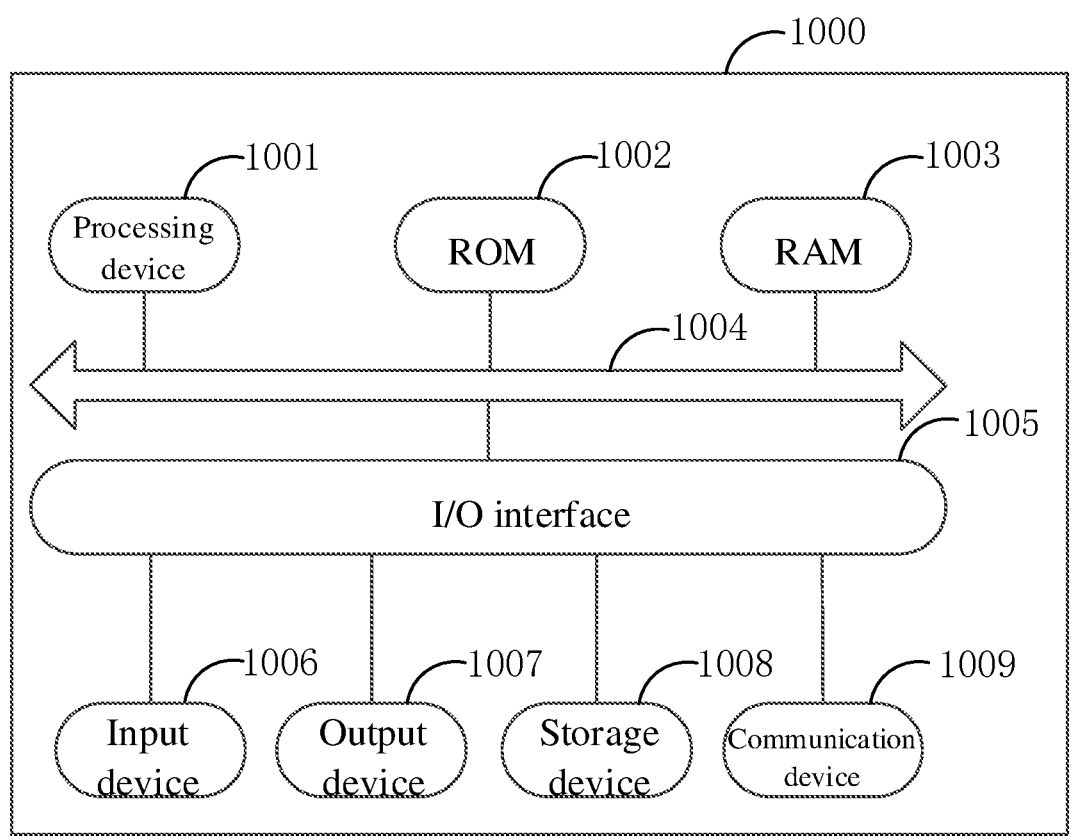
FIG. 10 is a schematic diagram of a basic structure of an electronic device provided by the embodiments of the present disclosure.

As shown in FIG. 10, electronic device 1000 may include a processing device (such as a central processing unit, a graphics processing unit, etc.) 1001 which may perform various appropriate actions and processes according to programs stored in read-only memory (ROM) 1002 or programs loaded from storage device 1008 into random access memory (RAM) 1003. In RAM 1003, various programs and data required for the operation of electronic device 1000 are also stored. The processing device 1001, ROM 1002, and RAM 1003 are connected to each other through the bus 1004. The input/output (I/O) interface 1005 is also connected to the bus 1004.

Typically, the following devices can be connected to I/O interface 1005: the input device 1006 including such as touch screen, touchpad, keyboard, mouse, camera, microphone, accelerometer, gyroscope, and the like; the output device 1007 including such as liquid crystal display (LCD), speaker, vibrator, and the like; the storage device 1008 including such as magnetic tape, hard disk, and the like; and the communication device 1009. The communication device 1009 can allow the electronic device 1000 to conduct wireless or wired connection with other devices to exchange data. Although FIG. 10 illustrates an electronic device 1000 with various devices, it should be understood that it is not required to implement or possess all the shown devices. More or fewer devices can be implemented or possessed alternatively.

Specifically, according to the embodiments of the present disclosure, the process described above with reference to the flowchart can be implemented as computer software programs. For example, the embodiments of the present disclosure provide a computer program product, which includes a computer program carried on a non-transient computer-readable medium. The computer program includes the program code for executing the method shown in the flowchart. In such an embodiment, the computer program can be downloaded and installed from the network through the communication device 1009, installed from the storage device 1008, or installed from the ROM 1002. When the computer program is executed by the processing device 1001, the above functions defined in the method of the embodiments of the present disclosure are performed.

The electronic device provided by the embodiments of the present disclosure belongs to the same inventive concept as the method of generating acoustic features, the method of speech model training, and the method of speech recognition provided by the above embodiments. Technical details which are not fully described in this embodiment can be found in the above embodiments, and the present embodiment has the same beneficial effects as the above embodiments.

Based on the method of generating acoustic features, the method of speech model training, and the method of speech recognition provided by the above method embodiments, the embodiments of the present disclosure provide a computer storage medium on which a computer program is stored. The program implements the method of generating acoustic features, the method of the speech model training, or the method of speech recognition as described in any one of the above embodiments when executed by a processor.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above computer-readable medium carries one or more programs, when the one or more programs are executed by the electronic device, the electronic device perform the method of generating acoustic features, the method of speech model training, or the method of speech recognition mentioned above.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances. For example, a speech data acquisition module can also be described as a "data acquisition module".

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, [Example 1] provides a method of generating acoustic features, the method includes:

acquiring an acoustic information vector of a current speech frame and an information weight of the current speech frame;

obtaining an accumulated information weight corresponding to the current speech frame according to an accumulated information weight corresponding to a previous speech frame, a retention rate corresponding to the current speech frame, and an information weight of the current speech frame; in which the retention rate is a difference between 1 and a leakage rate;

in a case that the accumulated information weight corresponding to the current speech frame is less than a threshold, obtaining an integrated acoustic information vector corresponding to the current speech frame according to an integrated acoustic information vector corresponding to the previous speech frame, the retention rate corresponding to the current speech frame, the information weight of the current speech frame, and the acoustic information vector of the current speech frame;

in a case that the accumulated information weight corresponding to the current speech frame is greater than or equal to the threshold, using the integrated acoustic information vector corresponding to the previous speech frame and the acoustic information vector of the current speech frame to output an issued integrated acoustic information vector, and calculating to obtain the integrated acoustic information vector corresponding to the current speech frame;

after obtaining the integrated acoustic information vector corresponding to the current speech frame, taking a next speech frame as the current speech frame, and repeating a step of acquiring the acoustic information vector of the current speech frame and the information weight of the current speech frame, as well as subsequent steps, until there is no next speech frame.

According to one or more embodiments of the present disclosure, [Example 2] provides a method of generating acoustic features, the obtaining of the accumulated information weight corresponding to the current speech frame according to the accumulated information weight corresponding to the previous speech frame, the retention rate corresponding to the current speech frame, and the information weight of the current speech frame comprises:

multiplying the accumulated information weight corresponding to the previous speech frame by the retention rate corresponding to the current speech frame, and then adding the information weight of the current speech frame to obtain the accumulated information weight corresponding to the current speech frame.

According to one or more embodiments of the present disclosure, [Example 3] provides a method of generating acoustic features, in the case that the accumulated information weight corresponding to the current speech frame is less than a threshold, the obtaining of the integrated acoustic information vector corresponding to the current speech frame according to the integrated acoustic information vector corresponding to the previous speech frame, the retention rate corresponding to the current speech frame, the information weight of the current speech frame, and the acoustic information vector of the current speech frame comprises:

in the case that the accumulated information weight corresponding to the current speech frame is less than the threshold, multiplying the integrated acoustic information vector corresponding to the previous speech frame by the retention rate corresponding to the current speech frame, and then adding a product of the information weight of the current speech frame and the acoustic information vector of the current speech frame to obtain the integrated acoustic information vector corresponding to the current speech frame.

According to one or more embodiments of the present disclosure, [Example 4] provides a method of generating acoustic features, in the case that the accumulated information weight corresponding to the current speech frame is greater than or equal to a threshold, the using of the integrated acoustic information vector corresponding to the previous speech frame and the acoustic information vector of the current speech frame to output the issued integrated acoustic information vector comprises:

in the case that the accumulated information weight corresponding to the current speech frame is greater than or equal to the threshold, calculating the accumulated information weight corresponding to the previous speech frame being multiplied by the retention rate corresponding to the current speech frame, obtaining a first value, calculating a difference between 1 and the first value, and obtaining a first part of the information weight of the current speech frame;

multiplying the integrated acoustic information vector corresponding to the previous speech frame by the retention rate corresponding to the current speech frame, and then adding a product of the first part of the information weight of the current speech frame and the acoustic information vector of the current speech frame to obtain the issued integrated acoustic information vector.

According to one or more embodiments of the present disclosure, [Example 5] provides a method of generating acoustic features, the calculating to obtain the integrated acoustic information vector corresponding to the current speech frame comprises:

calculating the difference between the information weight of the current speech frame and the first part of the information weight of the current speech frame to obtain a second part of the information weight of the current speech frame, and taking the second part of the information weight of the current speech frame as the accumulated information weight of the current speech frame;

calculating the second part of the information weight of the current speech frame being multiplied by the acoustic information vector of the current speech frame to obtain the integrated acoustic information vector corresponding to the current speech frame.

According to one or more embodiments of the present disclosure, [Example 6] provides a method of generating acoustic features, the method further comprises:

inputting the acoustic information vector of the current speech frame and the integrated acoustic information vector corresponding to the previous speech frame into a predictive model to obtain the leakage rate of the current speech frame.

According to one or more embodiments of the present disclosure, [Example 7] provides a method of generating acoustic features, the leakage rate corresponding to the current speech frame is 0 for every interval of N speech frames, where N is a positive integer.

According to one or more embodiments of the present disclosure, [Example 8] provides a method of generating acoustic features, the method comprises:

inputting training speech data into an encoder to obtain an acoustic information vector of each speech frame;

inputting the acoustic information vector of each speech frame and an information weight of each speech frame into a continuous integrate-and-fire CIF module to obtain an issued integrated acoustic information vector;

the CIF module outputs the issued integrated acoustic information vector according to the method of generating acoustic features in any one of the embodiments;

inputting the issued integrated acoustic information vector into a decoder to obtain a word prediction result of the training speech data;

training the encoder, the CIF module, and the decoder according to the word prediction result and a word label corresponding to the training speech data.

According to one or more embodiments of the present disclosure, [Example 9] provides a method of generating acoustic features, the method comprises:

inputting speech data to be recognized into an encoder to obtain an acoustic information vector of each speech frame;

inputting the acoustic information vector of each speech frame and an information weight of each speech frame into a continuous integrate-and-fire CIF module to obtain an issued integrated acoustic information vector; the CIF module outputs the issued integrated acoustic information vector according to the method of generating acoustic features in any one of the embodiments;

inputting the issued integrated acoustic information vector into a decoder to obtain a word recognition result of the speech data to be recognized.

According to one or more embodiments of the present disclosure, [Example 10] provides a device of generating acoustic features, the device comprises:

a first acquisition unit which is used to acquire an acoustic information vector of a current speech frame and an information weight of the current speech frame;

a first calculation unit which is used to obtain an accumulated information weight corresponding to the current speech frame according to an accumulated information weight corresponding to a previous speech frame, a retention rate corresponding to the current speech frame, and the information weight of the current speech frame; the retention rate is a difference between 1 and a leakage rate;

a second calculation unit which is used to obtain an integrated acoustic information vector corresponding to the current speech frame according to the integrated acoustic information vector corresponding to the previous speech frame, the retention rate corresponding to the current speech frame, the information weight of the current speech frame, and the acoustic information vector of the current speech frame, in a case that the accumulated information weight corresponding to the current speech frame is less than a threshold;

a third calculation unit which is used to use the integrated acoustic information vector corresponding to the previous speech frame and the acoustic information vector of the current speech frame to output the issued integrated acoustic information vector, and calculate to obtain the integrated acoustic information vector corresponding to the current speech frame, in a case that the accumulated information weight corresponding to the current speech frame is greater than or equal to the threshold; and an execution unit which is used to take a next speech frame as the current speech frame, repeat a step of acquiring the acoustic information vector of the current speech frame and the information weight of the current speech frame, as well as subsequent steps, until there is no next speech frame after obtaining the integrated acoustic information vector corresponding to the current speech frame.

According to one or more embodiments of the present disclosure, [Example 11] provides a speech model training device, the first calculation unit is specifically used to multiply the accumulated information weight corresponding to the previous speech frame by the retention rate corresponding to the current speech frame, and then add it to the information weight of the current speech frame to obtain the accumulated information weight corresponding to the current speech frame.

According to one or more embodiments of the present disclosure, [Example 12] provides a device of generating acoustic features, the second calculation unit is specifically used to multiply the integrated acoustic information vector corresponding to the previous speech frame by the retention rate corresponding to the current speech frame, add it to the product of the information weight of the current speech frame and the acoustic information vector of the current speech frame to obtain the integrated acoustic information vector corresponding to the current speech frame, if the accumulated information weight corresponding to the current speech frame is less than a threshold.

According to one or more embodiments of the present disclosure, [Example 13] provides a device of generating acoustic features, the third computing unit comprises:

a first calculation sub unit which is used to calculate the accumulated information weight corresponding to the previous speech frame being multiplied by the retention rate corresponding to the current speech frame, obtain the first value, calculate the difference between 1 and the first value, and obtain the first part of the information weight of the current speech frame, if the accumulated information weight corresponding to the current speech frame is greater than or equal to a threshold; and a second calculation sub unit which is used to multiply the integrated acoustic information vector corresponding to the previous speech frame by the retention rate corresponding to the current speech frame, and then add it to the product of the first part of the information weight of the current speech frame and the acoustic information vector of the current speech frame to obtain the issued integrated acoustic information vector.

According to one or more embodiments of the present disclosure, [Example 14] provides a device of generating acoustic features, the third computing unit comprises:

a third calculation sub unit which is used to calculate the difference between the information weight of the current speech frame and the first part of the information weight of the current speech frame to obtain the second part of the information weight of the current speech frame, and use the second part of the information weight of the current speech frame as the accumulated information weight of the current speech frame; and a fourth calculation sub unit which is used to calculate the second part of the information weight of the current speech frame being multiplied by the acoustic information vector of the current speech frame, and obtain the integrated acoustic information vector corresponding to the current speech frame.

According to one or more embodiments of the present disclosure, [Example 15] provides a device of generating acoustic features, which further comprises:

a second acquisition unit which is used to input the acoustic information vector of the current speech frame and the integrated acoustic information vector corresponding to the previous speech frame into the predictive model to acquire the leakage rate of the current speech frame.

According to one or more embodiments of the present disclosure, [Example 16] provides a device of generating acoustic features. The leakage rate corresponding to the current speech frame is 0 for every interval of N speech frames.

According to one or more embodiments of the present disclosure, [Example 17] provides a device of speech model training, the device comprises:

a first training unit which is used to input training speech data into an encoder to obtain an acoustic information vector of each speech frame;

a second training unit which is used to input the acoustic information vector of each speech frame and an information weight of each speech frame into a continuous integrate-and-fire CIF module to obtain an issued integrated acoustic information vector; in which the CIF module outputs the issued integrated acoustic information vector according to the method of generating acoustic features in any one of the embodiments;

a third training unit which is used to input the issued integrated acoustic information vector into a decoder to obtain a word prediction result of the training speech data; and a fourth training unit which is used to train the encoder, the CIF module, and the decoder according to the word prediction result and a word label corresponding to the training speech data.

According to one or more embodiments of the present disclosure, [Example 18] provides a device of speech recognition, the device comprises:

a first input unit which is used to input speech data to be recognized into an encoder to obtain an acoustic information vector of each speech frame;

a second input unit which is used to input the acoustic information vector of each speech frame and an information weight of each speech frame into a continuous integrate-and-fire CIF module to obtain an issued integrated acoustic information vector; the CIF module outputs the issued integrated acoustic information vector according to the method of generating acoustic features in any one of the embodiments; and a third input unit which is used to input the issued integrated acoustic information vector into the decoder to obtain a word recognition result of the speech data to be recognized.

According to one or more embodiments of the present disclosure, [Example 19] provides an electronic device, which comprises:

one or more processors; and a storage device on which one or more programs are stored, in a case that the one or more programs are executed by one or more processors, the one or more processors are allowed to implement the method of generating acoustic features, the method of speech model training, and method of speech recognition in any one of the embodiments.

According to one or more embodiments of the present disclosure, [Example 20] provides a computer-readable medium on which a computer program is stored, the program implements the method of generating acoustic features, the method of speech model training, and method of speech recognition in any one of the embodiments when executed by a processor.

It should be noted that each embodiment in the present specification is described in a progressive manner, and each embodiment focuses on the differences from other embodiments. The same and similar parts between each embodiment can be referred to each other. For the system or device disclosed by the embodiments, the description is relatively simple as it corresponds to the method disclosed by the embodiments. Please refer to illustration of the method section for relevant information.

It should be understood that in the present disclosure, "at least one (item)" refers to one or more, and "multiple" refers to two or more. "And/or" is used to describe the association relationship of associated objects, indicating that there can be three types of relationships. For example, "A and/or B" can represents three situations: only A, only B, and both A and B, where A and B can be singular or plural. The character "/" generally indicates that the associated object is an "or" relationship. "At least one of the following items" or similar expressions refer to any combination of these items, comprising any combination of single or plural items (numbers). For example, at least one item (number) in a, b, or c can represent: a, b, c, "a and b", "a and c", "b and c", or "a and b and c", where a, b, c can be single or multiple.

It should also be noted that in this article, relationship terms such as first and second are only used to distinguish one entity or operation from another entity or operation, and do not necessarily require or imply any actual relationship or order between these entities or operations. Moreover, the terms "comprising", "including", or any other variation thereof are intended to encompass non-exclusive inclusion, such that the process, method, item, or device that comprises a series of elements not only comprises those elements, but also other elements that are not explicitly listed, but also comprises elements inherent in such a process, method, item, or equipment. Without further limitations, the elements limited by the statement "comprising one . . . " do not exclude the existence of other identical elements in the process, method, item, or equipment that comprises the elements.

The steps of the method or algorithm described in combination with the disclosed embodiments in this article can be directly implemented using hardware, software modules executed by processors, or a combination of the two. Software modules can be placed in random access memory (RAM), memory, read-only memory (ROM), electrically programmable ROM, electrically erasable programmable ROM, register, hard disk, removable magnetic disk, CD-ROM, or any other form of storage medium known in the technical field.

The above explanation of the disclosed embodiments enables those skilled in the art to implement or use the present disclosure. The various modifications to these embodiments will be apparent to those skilled in the art, and the general principles defined in this article can be implemented in other embodiments without departing from the spirit or scope of the present disclosure. Therefore, the present disclosure will not be limited to the embodiments shown herein, but will be subject to the widest scope consistent with the principles and novel features disclosed herein.

The invention claimed is:

1. A method of generating acoustic features, comprising:
acquiring an acoustic information vector of a current speech frame and an information weight of the current speech frame;
obtaining an accumulated information weight corresponding to the current speech frame according to an accumulated information weight corresponding to a previous speech frame, a retention rate corresponding to the current speech frame, and an information weight of the current speech frame; wherein the retention rate is a difference between 1 and a leakage rate;
in a case that the accumulated information weight corresponding to the current speech frame is less than a threshold, obtaining an integrated acoustic information vector corresponding to the current speech frame according to an integrated acoustic information vector corresponding to the previous speech frame, the retention rate corresponding to the current speech frame, the information weight of the current speech frame, and the acoustic information vector of the current speech frame;

in a case that the accumulated information weight corresponding to the current speech frame is greater than or equal to the threshold, using the integrated acoustic information vector corresponding to the previous speech frame and the acoustic information vector of the current speech frame to output an issued integrated acoustic information vector, and calculating to obtain the integrated acoustic information vector corresponding to the current speech frame; and after obtaining the integrated acoustic information vector corresponding to the current speech frame, taking a next speech frame as the current speech frame, and repeating a step of acquiring the acoustic information vector of the current speech frame and the information weight of the current speech frame and subsequent steps until there is no next speech frame.

2. The method according to claim 1, wherein the obtaining of the accumulated information weight corresponding to the current speech frame according to the accumulated information weight corresponding to the previous speech frame, the retention rate corresponding to the current speech frame, and the information weight of the current speech frame comprises:

multiplying the accumulated information weight corresponding to the previous speech frame by the retention rate corresponding to the current speech frame, and then adding the information weight of the current speech frame to obtain the accumulated information weight corresponding to the current speech frame.

3. The method according to claim 1, wherein in the case that the accumulated information weight corresponding to the current speech frame is less than a threshold, the obtaining of the integrated acoustic information vector corresponding to the current speech frame according to the integrated acoustic information vector corresponding to the previous speech frame, the retention rate corresponding to the current speech frame, the information weight of the current speech frame, and the acoustic information vector of the current speech frame comprises:

in the case that the accumulated information weight corresponding to the current speech frame is less than the threshold, multiplying the integrated acoustic information vector corresponding to the previous speech frame by the retention rate corresponding to the current speech frame, and then adding a product of the information weight of the current speech frame and the acoustic information vector of the current speech frame to obtain the integrated acoustic information vector corresponding to the current speech frame.

4. The method according to claim 1, wherein in the case that the accumulated information weight corresponding to the current speech frame is greater than or equal to a threshold, the using of the integrated acoustic information vector corresponding to the previous speech frame and the acoustic information vector of the current speech frame to output the issued integrated acoustic information vector comprises:

in the case that the accumulated information weight corresponding to the current speech frame is greater than or equal to the threshold, calculating the accumulated information weight corresponding to the previous speech frame being multiplied by the retention rate corresponding to the current speech frame, obtaining a first value, calculating a difference between 1 and the first value, and obtaining a first part of the information weight of the current speech frame;

multiplying the integrated acoustic information vector corresponding to the previous speech frame by the retention rate corresponding to the current speech frame, and then adding a product of the first part of the information weight of the current speech frame and the acoustic information vector of the current speech frame to obtain the issued integrated acoustic information vector.

5. The method according to claim 4, wherein the calculating to obtain the integrated acoustic information vector corresponding to the current speech frame comprises:

calculating the difference between the information weight of the current speech frame and the first part of the information weight of the current speech frame to obtain a second part of the information weight of the current speech frame, and taking the second part of the information weight of the current speech frame as the accumulated information weight of the current speech frame; and calculating the second part of the information weight of the current speech frame being multiplied by the acoustic information vector of the current speech frame to obtain the integrated acoustic information vector corresponding to the current speech frame.

6. The method according to claim 1, further comprising:
inputting the acoustic information vector of the current speech frame and the integrated acoustic information vector corresponding to the previous speech frame into a predictive model to obtain the leakage rate of the current speech frame.

7. The method according to claim 1, wherein the leakage rate corresponding to the current speech frame is 0 for every interval of N speech frames, where N is a positive integer.

8. A method of speech model training, comprising:
inputting training speech data into an encoder to obtain an acoustic information vector of each speech frame;
inputting the acoustic information vector of each speech frame and an information weight of each speech frame into a continuous integrate-and-fire CIF module to obtain an issued integrated acoustic information vector; wherein the CIF module outputs the issued integrated acoustic information vector according to the method of generating acoustic features as claimed in claim 1;
inputting the issued integrated acoustic information vector into a decoder to obtain a word prediction result of the training speech data; and
training the encoder, the CIF module, and the decoder according to the word prediction result and a word label corresponding to the training speech data.

9. An electronic device, comprising:
one or more processors; and
a storage device on which one or more programs are stored,
in a case that the one or more programs are executed by one or more processors, the one or more processors are allowed to implement the method as claimed in claim 8.

10. A non-transitory computer-readable medium on which a computer program is stored, wherein the program implements the method as claimed in claim 8 when executed by a processor.

11. A method of speech recognition, comprising:
inputting speech data to be recognized into an encoder to obtain an acoustic information vector of each speech frame;

inputting the acoustic information vector of each speech frame and an information weight of each speech frame into a continuous integrate-and-fire CIF module to obtain an issued integrated acoustic information vector; wherein the CIF module outputs the issued integrated acoustic information vector according to the method of generating acoustic features as claimed in claim 1; and inputting the issued integrated acoustic information vector into a decoder to obtain a word recognition result of the speech data to be recognized.

12. An electronic device, comprising:
one or more processors; and
a storage device on which one or more programs are stored,
in a case that the one or more programs are executed by one or more processors, the one or more processors are allowed to implement the method as claimed in claim 11.

13. A non-transitory computer-readable medium on which a computer program is stored, wherein the program implements the method as claimed in claim 11 when executed by a processor.

14. A speech model training device, comprising:
at least one processor; and
at least one memory communicatively coupled to the at least one processor and comprising computer-readable instructions that upon execution by the at least one processor cause the at least one processor to:
input training speech data into an encoder to obtain an acoustic information vector of each speech frame;
input the acoustic information vector of each speech frame and an information weight of each speech frame into a continuous integrate-and-fire CIF module to obtain an issued integrated acoustic information vector; wherein the CIF module outputs the issued integrated acoustic information vector according to the method of generating acoustic features as claimed in claim 1;
input the issued integrated acoustic information vector into a decoder to obtain a word prediction result of the training speech data; and
train the encoder, the CIF module, and the decoder according to the word prediction result and a word label corresponding to the training speech data.

15. A speech recognition device, comprising:
at least one processor; and
at least one memory communicatively coupled to the at least one processor and comprising computer-readable instructions that upon execution by the at least one processor cause the at least one processor to:
input speech data to be recognized into an encoder to obtain an acoustic information vector of each speech frame;
input the acoustic information vector of each speech frame and an information weight of each speech frame into a continuous integrate-and-fire CIF module to obtain an issued integrated acoustic information vector; wherein the CIF module outputs the issued integrated acoustic information vector according to the method of generating acoustic features as claimed in claim 1; and input the issued integrated acoustic information vector into the decoder to obtain a word recognition result of the speech data to be recognized.

16. An electronic device, comprising:
one or more processors; and
a storage device on which one or more programs are stored,
in a case that the one or more programs are executed by one or more processors, the one or more processors are allowed to implement the method as claimed in claim 1.

17. A non-transitory computer-readable medium on which a computer program is stored, wherein the program implements the method as claimed in claim 1 when executed by a processor.

18. A device of generating acoustic features, comprising:
at least one processor, and
at least one memory communicatively coupled to the at least one processor and comprising computer-readable instructions that upon execution by the at least one processor cause the at least one processor to:
acquire an acoustic information vector of a current speech frame and an information weight of the current speech frame;
obtain an accumulated information weight corresponding to the current speech frame according to an accumulated information weight corresponding to a previous speech frame, a retention rate corresponding to the current speech frame, and the information weight of the current speech frame; wherein the retention rate is a difference between 1 and a leakage rate;
obtain an integrated acoustic information vector corresponding to the current speech frame according to the integrated acoustic information vector corresponding to the previous speech frame, the retention rate corresponding to the current speech frame, the information weight of the current speech frame, and the acoustic information vector of the current speech frame, in a case that the accumulated information weight corresponding to the current speech frame is less than a threshold;
use the integrated acoustic information vector corresponding to the previous speech frame and the acoustic information vector of the current speech frame to output the issued integrated acoustic information vector, and calculate to obtain the integrated acoustic information vector corresponding to the current speech frame, in a case that the accumulated information weight corresponding to the current speech frame is greater than or equal to the threshold; and
take a next speech frame as the current speech frame, repeat a step of acquiring the acoustic information vector of the current speech frame and the information weight of the current speech frame, as well as subsequent steps, until there is no next speech frame after obtaining the integrated acoustic information vector corresponding to the current speech frame.

* * * * *